United States Patent
An et al.

(10) Patent No.: US 11,806,807 B2
(45) Date of Patent: Nov. 7, 2023

(54) LASER WELDING METHOD AND LASER WELDING DEVICE FOR SECONDARY BATTERY

(71) Applicant: SAMSUNG SDI CO., LTD., Yongin-si (KR)

(72) Inventors: Yong Gyu An, Yongin-si (KR); Hyung Bin Park, Yongin-si (KR); Hee Dong Jung, Yongin-si (KR); Jin Gyu Heo, Yongin-si (KR); Myung Jun Park, Yongin-si (KR); Jae Hoon Roh, Yongin-si (KR); Sang Hyun Ryu, Yongin-si (KR); Seong Bae An, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 17/511,707

(22) Filed: Oct. 27, 2021

(65) Prior Publication Data
US 2022/0126399 A1  Apr. 28, 2022

(30) Foreign Application Priority Data
Oct. 28, 2020  (KR) .................. 10-2020-0141395

(51) Int. Cl.
*B23K 26/21*  (2014.01)
(52) U.S. Cl.
CPC .................................. *B23K 26/21* (2015.10)
(58) Field of Classification Search
CPC .. B23K 26/21; B23K 26/0622; B23K 26/032; B23K 26/0626; B23K 26/073; B23K 26/22; B23K 26/702; B23K 31/125; B23K 2101/36; B23K 2101/38; H01M 50/55; H01M 50/536; H01M 50/557;
(Continued)

(56) References Cited

U.S. PATENT DOCUMENTS

| | | | |
|---|---|---|---|
| 10,056,597 B2 * | 8/2018 | Park | H01M 50/543 |
| 2009/0223940 A1 * | 9/2009 | Hosoya | H01R 43/0221 219/136 |

(Continued)

FOREIGN PATENT DOCUMENTS

| | | |
|---|---|---|
| CN | 108465933 A | 8/2018 |
| CN | 209822770 U | 12/2019 |

(Continued)

OTHER PUBLICATIONS

European Search Report (partial) dated Mar. 1, 2022 for corresponding European Patent Application No. 21205230.2.
(Continued)

*Primary Examiner* — David P Bryant
*Assistant Examiner* — Christine Bersabal
(74) *Attorney, Agent, or Firm* — Lee IP Law, P.C.

(57) ABSTRACT

Disclosed is a laser welding method for a secondary battery, in which a first electrode substrate tab and a second electrode substrate tab are laser-welded onto a first electrode uncoated region of a first electrode plate and a second electrode uncoated region of a second electrode plate, respectively, wherein the first electrode substrate tab and the second electrode substrate tab are fusion-bonded with a laser beam so as to have a preset welding pattern at welding portions thereof.

7 Claims, 12 Drawing Sheets

(58) Field of Classification Search
CPC ............. H01M 50/566; H01M 50/528; H01M 50/531; Y02E 60/10
See application file for complete search history.

(56) References Cited

U.S. PATENT DOCUMENTS

| | | |
|---|---|---|
| 2017/0341144 A1 | 11/2017 | Pelaprat et al. |
| 2018/0361515 A1 | 12/2018 | Kagiya et al. |
| 2020/0373544 A1 | 11/2020 | Park |
| 2021/0399269 A1 | 12/2021 | Peng |

FOREIGN PATENT DOCUMENTS

| | | |
|---|---|---|
| CN | 111682157 A | 9/2020 |
| DE | 102013015710 A1 | 7/2014 |
| JP | H2-137687 | 5/1990 |
| JP | 2007-214086 A | 8/2007 |
| JP | 2016-30280 A | 3/2016 |
| JP | 2019-514694 A | 6/2019 |
| JP | 2020-17483 A | 1/2020 |
| KR | 10-19414117 B1 | 1/2019 |
| KR | 10-2019-0012175 A | 2/2019 |
| KR | 10-2019-0082549 A | 7/2019 |
| KR | 10-2094210 B1 | 3/2020 |
| WO | WO 2006/016441 A1 | 2/2006 |

OTHER PUBLICATIONS

Japanese Office Action dated Nov. 21, 2022 for corresponding Japanese Patent Application No. 2021-175508.
Notice of Allowance dated May 22, 2023 of the Japanese Patent Application No. 2021-175508 corresponding to this application.

\* cited by examiner

10

LASER WELDING METHOD AND LASER WELDING DEVICE FOR SECONDARY BATTERY

CROSS-REFERENCE TO RELATED APPLICATION

This application claims priority to and the benefit of Korean Patent Application No. 10-2020-0141395, filed on Oct. 28, 2020, in the Korean Intellectual Property Office, the contents of which in its entirety are herein incorporated by reference.

BACKGROUND

1. Field

Embodiments of the present disclosure relate to a laser welding method for a secondary battery and a laser welding apparatus, in which the welding quality of an ultra-thin welding area can be improved.

2. Description of the Related Art

A secondary battery includes an electrode assembly with a positive electrode, a negative electrode, and a separator interposed between the positive electrode and the negative electrode, and a cell including an electrolyte solution impregnated in the electrode assembly. In general, an electrode assembly of a secondary battery has a structure in which a negative or positive electrode active material layer is formed on a thin-film substrate, and a negative or positive electrode substrate tab is formed on an uncoated region, i.e., a region on which the active material layer is not formed.

SUMMARY

According to an aspect of embodiments, a laser welding method for a secondary battery may include irradiating a first laser beam to laser-weld a first electrode substrate tab onto a first electrode uncoated region of a first electrode plate, such that the first laser beam is irradiated onto a first welding portion, the first welding portion being on an overlap region between the first electrode substrate tab and the first electrode uncoated region, and irradiating a second laser beam to laser-weld a second electrode substrate tab onto a second electrode uncoated region of a second electrode plate, such that the second laser beam is irradiated onto a second welding portion, the second welding portion being on an overlap region between the second electrode substrate tab and the second electrode uncoated region, wherein the first electrode substrate tab and the second electrode substrate tab are fusion-bonded with the first and second laser beams, respectively, so as to have a preset welding pattern at each of the first and second welding portions.

The welding portions to which the laser beam is irradiated may be the first electrode substrate tab and the second electrode substrate tab.

The welding portions to which the laser beam is irradiated may be the first electrode uncoated region and the second electrode uncoated region.

The welding portions may be subjected to spot welding, and the welding pattern may be formed by overlapping the spot-welded portions.

According to an aspect of embodiments, a laser welding apparatus for a secondary battery may include a main body, a sensor on one side of the main body, the sensor being configured to detect a light reflected from a welding portion, reflection members inside the main body, the reflection members being configured to transmit the light reflected from the welding portion to the sensor, and a controller electrically connected to the sensor, the controller being configured to compare an output value of the sensor with a preset reference value, and to determine whether the welding portion is defective.

The welding portion may be an electrode substrate tab that is welded to the uncoated region of the secondary battery.

The welding portion may be an electrode uncoated region that is welded to the electrode substrate tab of the secondary battery.

The welding portions may be subjected to spot welding, and the welding pattern may be formed by overlapping the spot-welded portions.

The sensor may be a photodiode sensor.

BRIEF DESCRIPTION OF DRAWINGS

Features will become apparent to those of skill in the art by describing in detail exemplary embodiments with reference to the attached drawings, in which.

DETAILED DESCRIPTION

Figure 1:
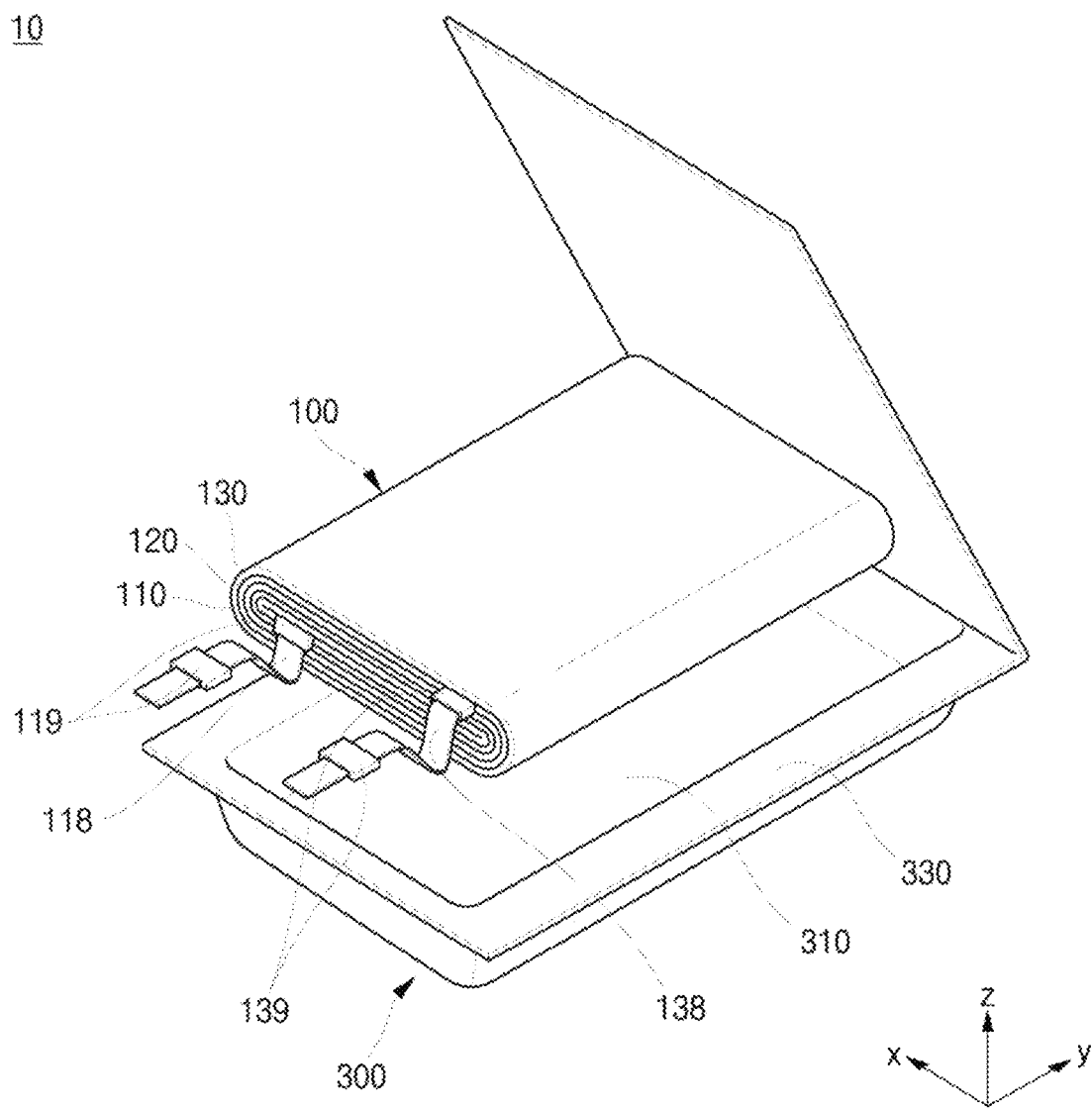
FIG. 1 is a perspective view of a secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

In addition, as used herein, the term "and/or" includes any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, e.g., "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Hereinafter, a laser welding method and a laser welding apparatus for a secondary battery, according to an embodiment, will be described in detail with reference to the accompanying drawings. A configuration of a secondary battery will be briefly described with reference to the drawings.

Figure 2:
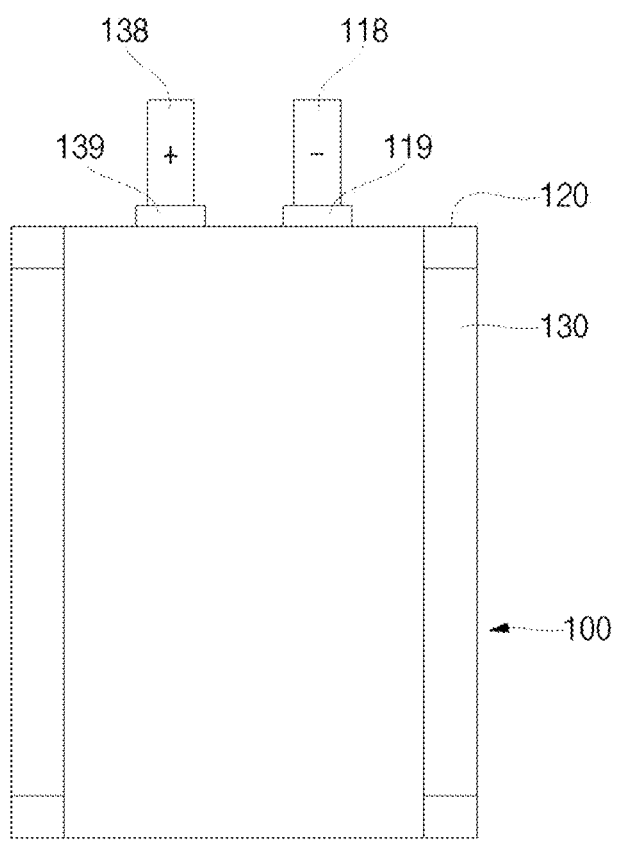
FIG. 2 is a plan view of an electrode assembly in FIG. 1.

FIG. 1 is a perspective view illustrating a secondary battery according to an embodiment. FIG. 2 is a partially view of the secondary battery of FIG. 1, and FIG. 3 is a plan view illustrating a portion of an electrode assembly according to FIG. 1.

Referring to FIGS. 1 and 2, a secondary battery 10 according to an embodiment may include an electrode assembly 100 and a pouch-shaped case 300 accommodating the electrode assembly 100. The electrode assembly 100 may be formed by winding or stacking a stack of a first electrode plate 110, a separator 120, and a second electrode plate 130 formed in a thin or film shape. For example, the first electrode plate 110 may be a negative electrode, and the second electrode plate 130 may be a positive electrode, e.g., but vice versa configuration may be applied as well. The electrode assembly 100 is also commonly referred to as a jelly roll. An example in which the electrode assembly 100 is wound will be described hereinafter.

Figure 3:
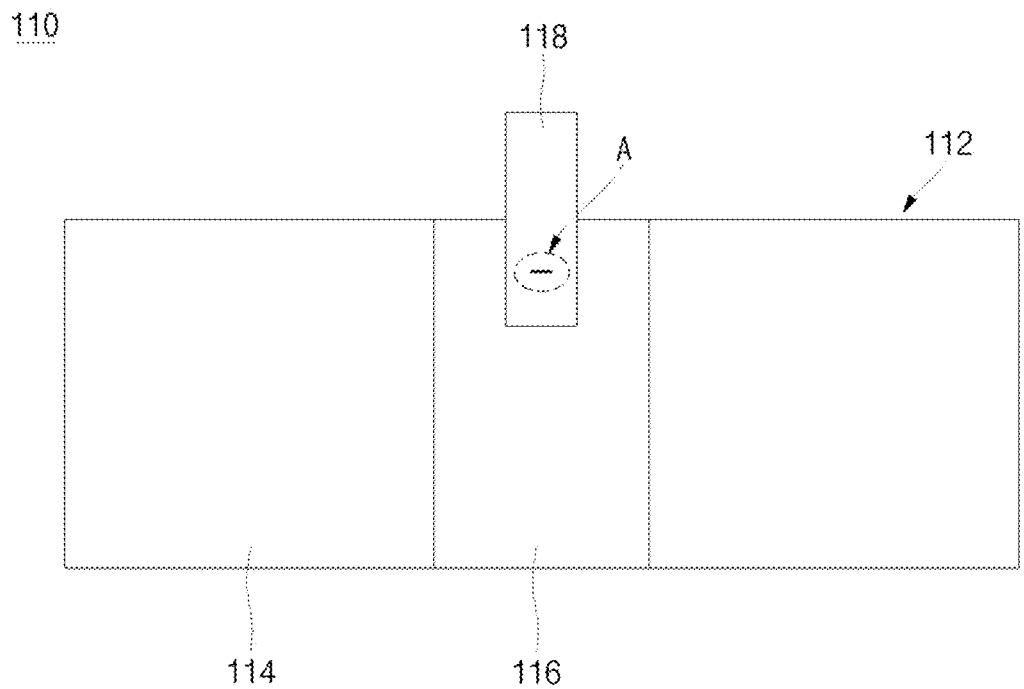
FIG. 3 is a plan view of a portion of an electrode assembly according to FIG. 1.

Referring to FIG. 3, the first electrode plate 110 may be formed by coating a first electrode active material 114, e.g., graphite or carbon, on a first electrode substrate 112 formed of a metal foil, e.g., copper, a copper alloy, nickel, or a nickel alloy. A first electrode uncoated region 116, i.e., a region to which the first electrode active material 114 is not applied, may be formed in a partial region of the first electrode substrate 112. A first electrode substrate tab 118 may be provided on the first electrode uncoated region 116 in the width direction of the first electrode substrate 112. For example, as illustrated in FIG. 3, when the first electrode active material 114 and the first electrode uncoated region 116 are adjacent to each other along a longitudinal direction of the first electrode substrate 112, first electrode substrate tab 118 may protrude from the first electrode uncoated region 116 in a direction perpendicular to the longitudinal direction of the first electrode substrate 112. For example, when the first electrode uncoated region 116 is formed at the center in the longitudinal direction of the first electrode substrate 112, the first electrode substrate tab 118 is referred to as a center tab.

The first electrode uncoated region 116 may be formed to be biased toward one side with respect to the longitudinal direction of the first electrode substrate 112. This also applies to the second electrode substrate tab 138 (FIG. 2), which will be described later.

As illustrated in FIG. 3, the first electrode substrate tab 118 extends outwardly of the first electrode substrate 112 (i.e., extends upward in FIG. 2). The first electrode substrate tab 118 serves as a passage for current flow between the first electrode plate 110 and an external terminal. As illustrated in FIGS. 1 and 2, an insulating member 119 may be attached to the first electrode substrate tab 118 to prevent the first electrode substrate tab 118 from being short-circuited with the case 300.

The second electrode plate 130 may be formed by coating a second electrode active material, e.g., a transition metal oxide, on a second electrode substrate formed of a metal foil, e.g., aluminum or an aluminum alloy. A second electrode uncoated region, i.e., a region to which the second electrode active material is not applied, may be provided in a partial region of the second electrode substrate. A second electrode substrate tab 138 may be formed on the second electrode uncoated region 136 in the width direction of the second electrode substrate 132. The second electrode substrate tab 138, as illustrated in FIGS. 1 and 2, may extend to the outside of the second electrode substrate (extends upward in FIG. 2). For example, the shapes of the first and second electrodes plates 110 and 130, as well as components thereof, may be identical or similar to each other.

For example, referring to FIGS. 1 and 2, the second electrode substrate tab 138 may be horizontally adjacent but spaced apart from the first electrode substrate tab 118, e.g., along the x direction. For example, as further illustrated in FIG. 1, the second electrode substrate tab 138 may be disposed in a region that does not overlap the first electrode substrate tab 118, e.g., along the z direction. The second electrode substrate tab 138 serves as a passage for current flow between the second electrode plate 130 and an external terminal. An insulating member 139 is attached to the second electrode substrate tab 138 to prevent the second electrode substrate tab 138 from being shorted with the case 300.

The above-described first electrode substrate tab 118 and second electrode substrate tab 138 may be connected to respective uncoated regions by welding, as shown in FIG. 3. For example, as illustrated in FIG. 3, a welding portion (A) may appear as a preset welding pattern, e.g., by using laser fusion-bonding that results in the preset welding pattern that will be described in more detail below with reference to FIGS. 7A-7C. A welding apparatus and a welding method of the first electrode substrate tab 118 and the second electrode substrate tab 138 will be described in more detail below.

Referring back to FIG. 1, the separator 120 may be interposed between the first electrode plate 110 and the second electrode plate 130, and prevents a short circuit between the first electrode plate 110 and the second electrode plate 130. To this end, the separator 120 may be formed to be larger than the first electrode plate 110 and the second electrode plate 130. The separator 120 may be made of, e.g., polyethylene, polypropylene, or a composite film of polyethylene and polypropylene.

As further illustrated in FIG. 1, the electrode assembly 100 having such a structure maybe wound together with the electrolyte and is accommodated in the case 300. The case 300 may be of a pouch or pocket type, and may be referred to as a laminate case, a pouch, a pouch case, or the like. The case 300 may include a recess 310, in which the electrode assembly 100 is accommodated. The recess 310 may be formed by bending plate-shaped exterior materials to face each other, followed by performing a press or drawing process. A sealing part 330 may be formed on the outer periphery of the recess 310, and the sealing part 330 may be sealed by thermal fusion, etc. in a state in which the electrode assembly 100 is accommodated in the recess 310.

In the secondary battery having the above-described configuration, a laser welding apparatus for welding a thin-film substrate (i.e., an uncoated region of an electrode plate) and a substrate tab, and a welding quality monitoring method, will be described as follows.

Figure 4A:
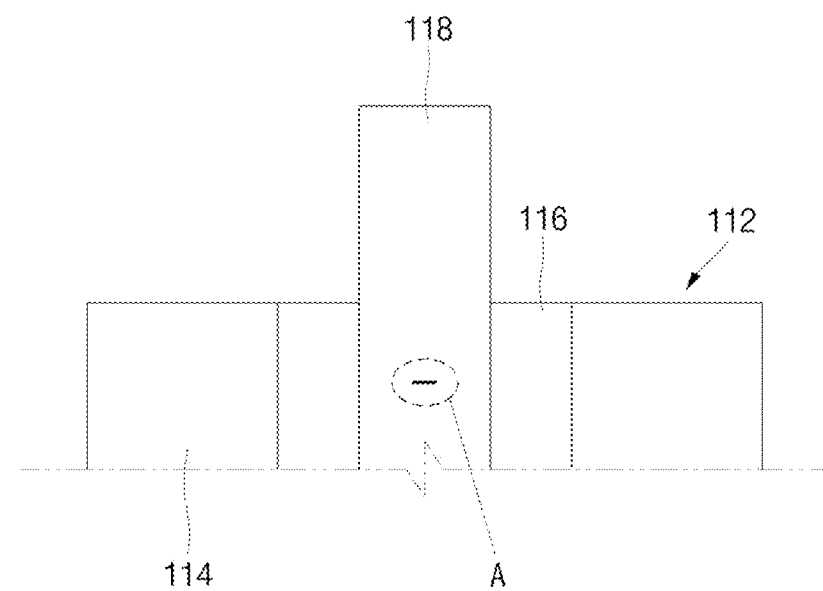
FIG. 4A is an enlarged plan view of a welding portion of the electrode assembly in FIG. 3.
Figure 4B:
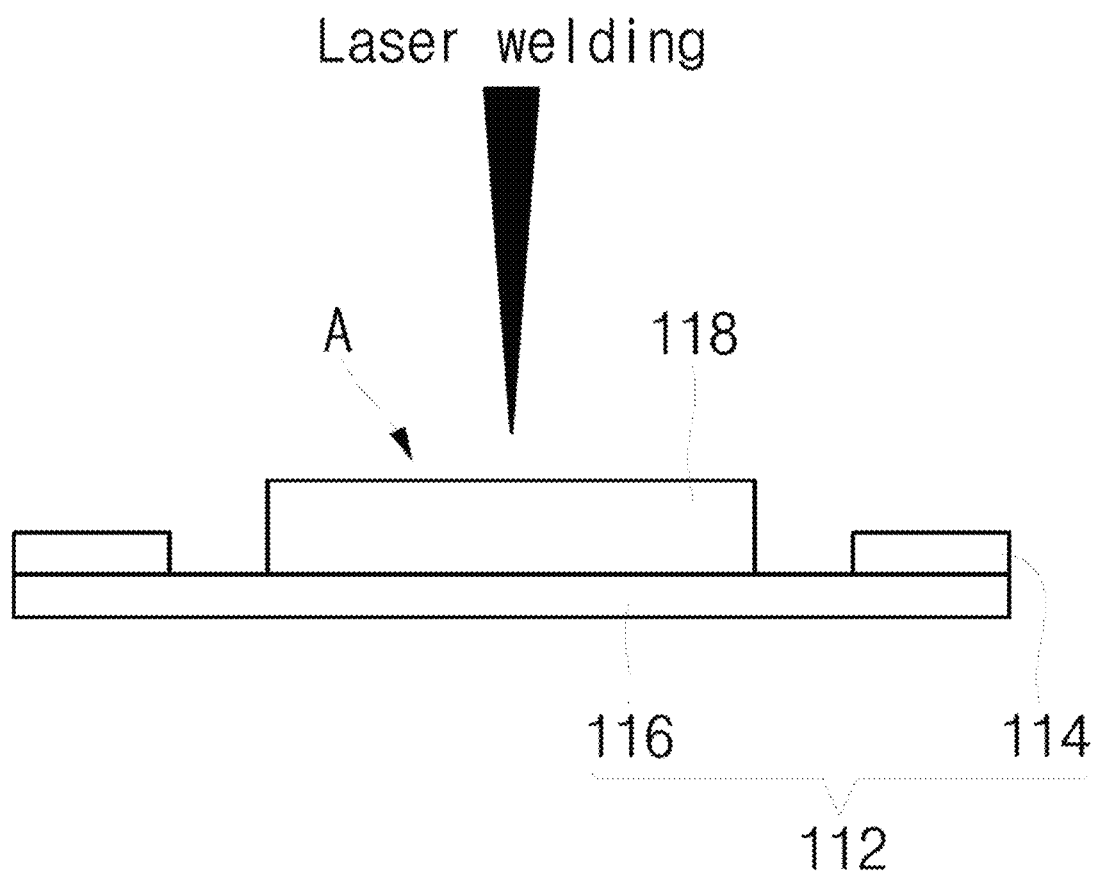
FIG. 4B is a side view of the welded portion in FIG. 4A.

FIG. 4A is an enlarged plan view of the welding portion (A) of the first electrode plate 110 in FIG. 3. FIG. 4B is a side view of the welded portion (A) of FIG. 4A.

Referring to FIG. 4A, the first electrode substrate tab 118 may be welded onto the first electrode uncoated region 116, i.e., a portion of the first electrode substrate 112 to which the first electrode active material 114 is not applied. Here, the welding method is laser welding, and the welding portion (A), i.e., a region to which the laser beam is irradiated, may be the first electrode substrate tab 118. For example, referring to FIG. 4B, the laser beam may be irradiated directly onto the welding portion (A), i.e., the laser beam may be irradiated directly onto the first electrode substrate tab 118. The same welding method may also be applied to the second electrode substrate tab 138.

Figure 4C:
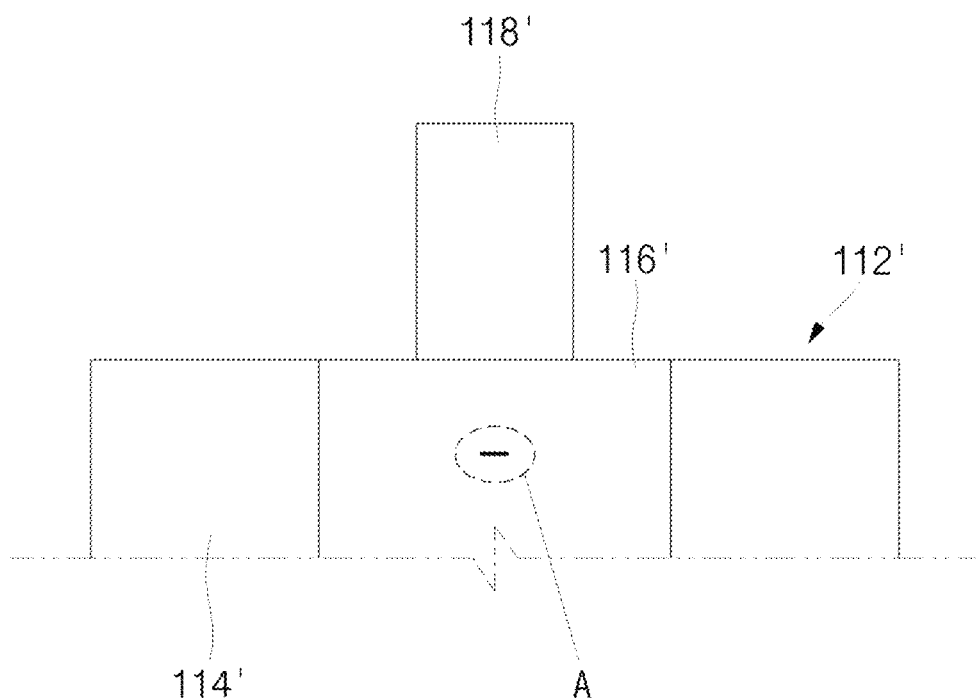
FIG. 4C is an enlarged plan view of a welding portion of an electrode assembly according to another embodiment.
Figure 4D:
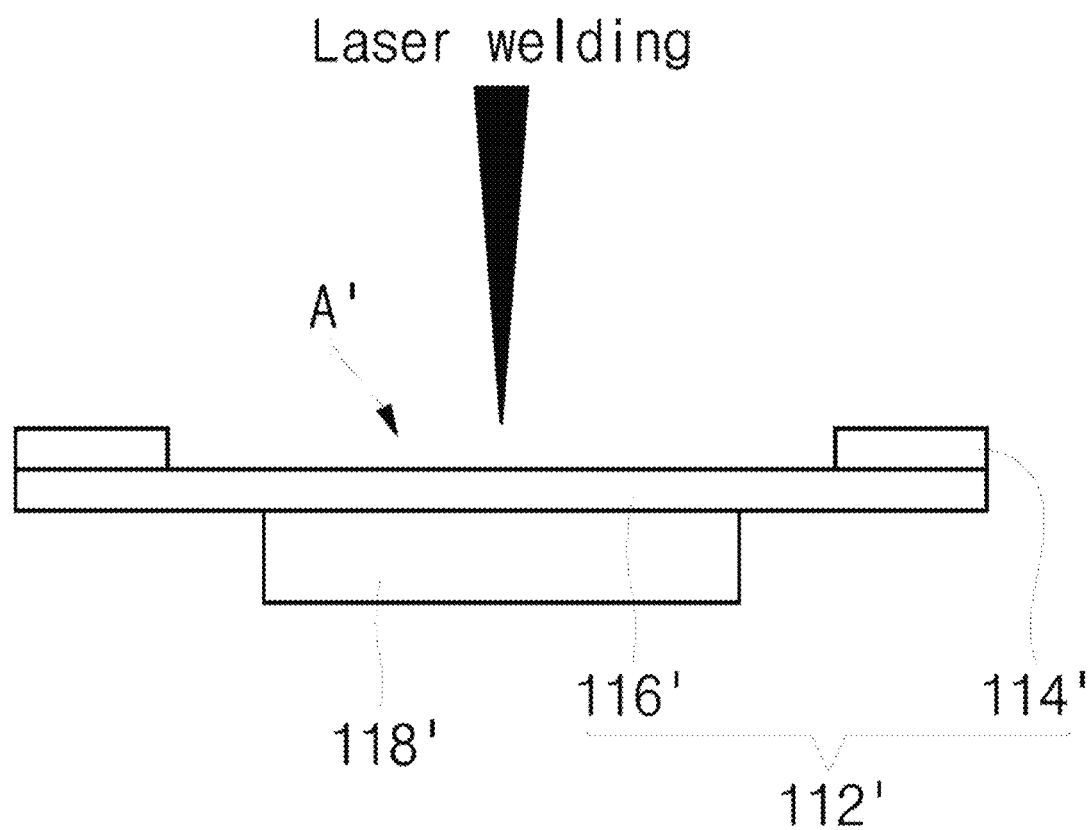
FIG. 4D is a side view of the welded portion in FIG. 4C.

FIG. 4C is an enlarged plan view of a welding portion (A') of an electrode assembly according to another embodiment. FIG. 4D is a side view of the welded portion (A') in FIG. 4C.

As shown in FIG. 4C, a first electrode substrate tab 118' is welded on the first electrode uncoated region 116', i.e., a portion of a first electrode substrate 112' to which a first electrode active material 114' is not applied. As shown in FIG. 4D, the welding portion (A') may not be formed on the first electrode substrate tab 118, but rather on the first electrode uncoated region 116'. That is, as shown in FIG. 4D, the laser beam may be irradiated directly onto the first electrode uncoated region 116', e.g., so the surface of the first electrode uncoated region 116' irradiated by the laser beam may be opposite to the surface of the first electrode uncoated region 116' directly contacting the first electrode substrate tab 118'.

Figure 5:
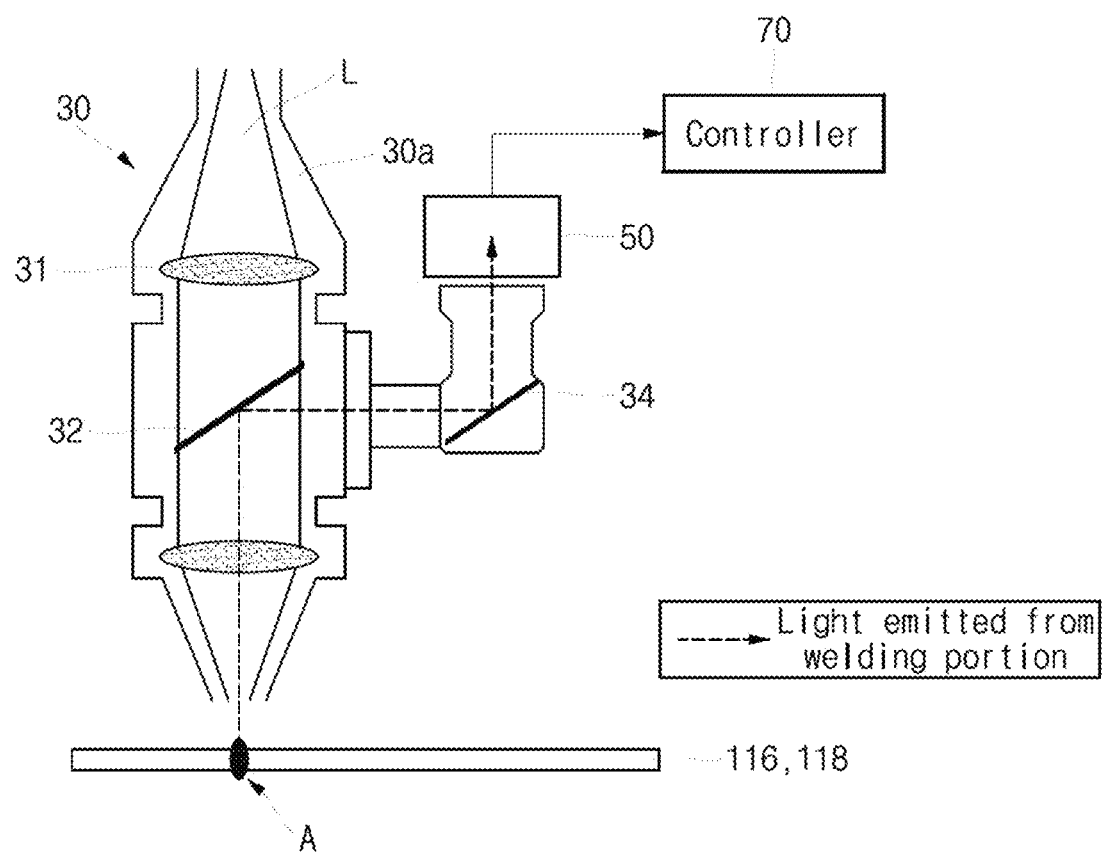
FIG. 5 is a schematic diagram of main components in a laser welding apparatus for a secondary battery and a monitoring device, according to an embodiment.
Figure 6A:
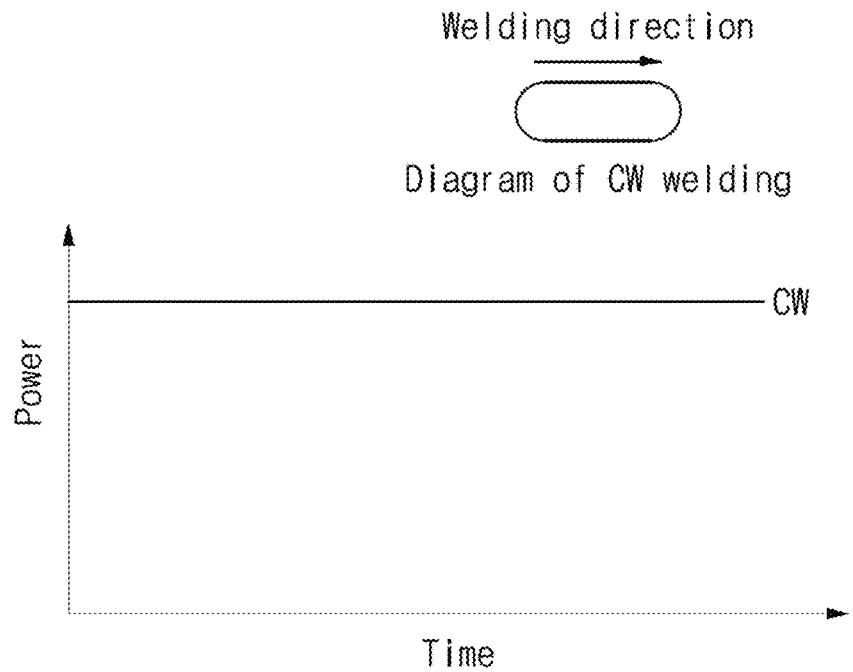
FIG. 6A is a graph of laser power according to welding time during general laser welding.
Figure 6B:
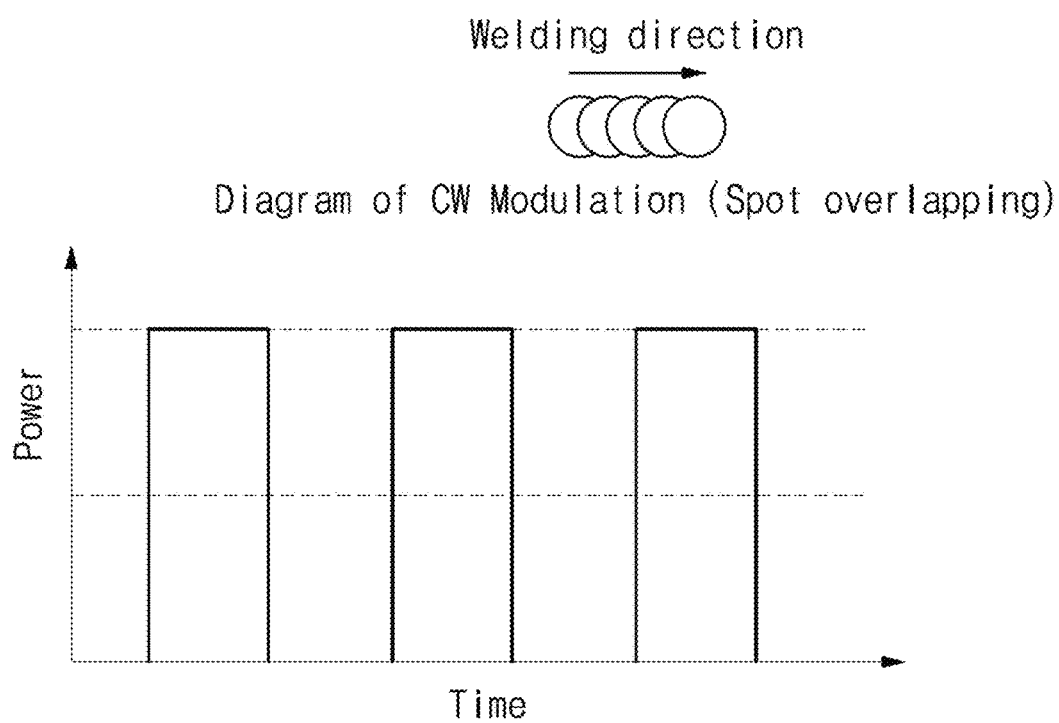
FIG. 6B is a graph of laser power according to welding time during laser welding according to an embodiment.

FIG. 5 is a schematic diagram of main components of a laser welding apparatus for a secondary battery and a monitoring device, according to an embodiment. FIG. 6A is a graph illustrating laser power according to welding time during a comparative laser welding, and FIG. 6B is a graph illustrating laser power according to welding time during laser welding according to an exemplary embodiment.

As shown in FIG. 5, a laser welding apparatus 30 may include a plurality of lenses 31, so a laser beam L is irradiated through the plurality of lenses 31 toward a welding target, e.g., toward the welding portion A on the first electrode substrate tab 118 (or welding portion A' on the first electrode uncoated region 116'), for welding the welding target. For example, as illustrated in FIG. 5, the laser beam L may be irradiated along a direction normal to a surface of the first electrode uncoated region 116, e.g., along a direction normal to a surface contact between the first electrode uncoated region 116 and the first electrode substrate tab 118, with the plurality of lenses 31 being spaced apart from each other along the irradiation direction of the laser.

In the laser welding apparatus 30, the plurality of lenses 31 and reflection members 32 and 34 may be installed inside a main body 30a, and a sensor 50 for monitoring the welding quality may be installed on one side or outside of the main body 30a. A controller 70 for determining the welding quality may be provided inside the main body 30a or may be separately provided, which will be described later.

Welding of a substrate tab and an uncoated portion of an electrode plate may generally be performed by an ultrasonic welding. However, an ultrasonic welding is a pressure-welding interface bonding method, which may have setting values of a welding horn and anvil varying depending on the skill level of an operator. In addition, ultrasonic welding requires a horn and an anvil (which are consumables), and may produce weak welding or crack defects that cannot be inspected, e.g., only penetration defects and presence/absence of welding may be visually inspected and detected in an ultrasonic welding.

Another general welding method may be performed by a non-contact melting bonding method, i.e., where a laser welding apparatus may be divided into continuous oscillation, pulse oscillation, and quick switch pulse oscillation modes according to the oscillation form of a laser beam. However, as shown in FIG. 6A, during the continuous oscillation mode welding (i.e., a continuous wave CW in which the output of the laser beam is kept constant), the welding pattern becomes a straight and continuous line along the welding direction, where penetration defects may occur during welding of a thin film. While formation of heat-affected zones during welding of thin films may be minimized by implementing spot welding in the non-contact melting bonding method, e.g., by setting the pulse oscillation mode or the quick switch pulse oscillation mode, small molten areas during spot welding of a welding region may have reduced welding strength, thereby requiring an appropriate size of a molten area of a welding region to maintain sufficient welding strength.

Therefore, according to example embodiments, a welding strength can be maintained at an appropriate level or more by controlling the output of a laser beam in the form of a pulse to overlap spot-welded portions, as shown in FIG. 6B. For example, as illustrated in FIG. 6B, intermittent pulses of a laser beam may be applied to a target, such that welding spots generated on the target by the laser beam may partially overlap each other into predetermined shapes (e.g., as determined by the controller). The pulse oscillation mode that overlaps the spot-welded portions is also referred to as CW modulation or laser spot overlap mode, e.g., the irradiating laser may be set into CW modulation or spot overlap mode (pulse overlap mode) to perform fuse-bonding in the welding portion (A). Therefore, the welding portion (A) in FIGS. 3-4D may be viewed in various shapes, e.g., various welding patterns formed by the overlapping spot-welded portions (rather than overlapping spots that are spaced apart from each other by a certain distance or more).

Figure 7A:
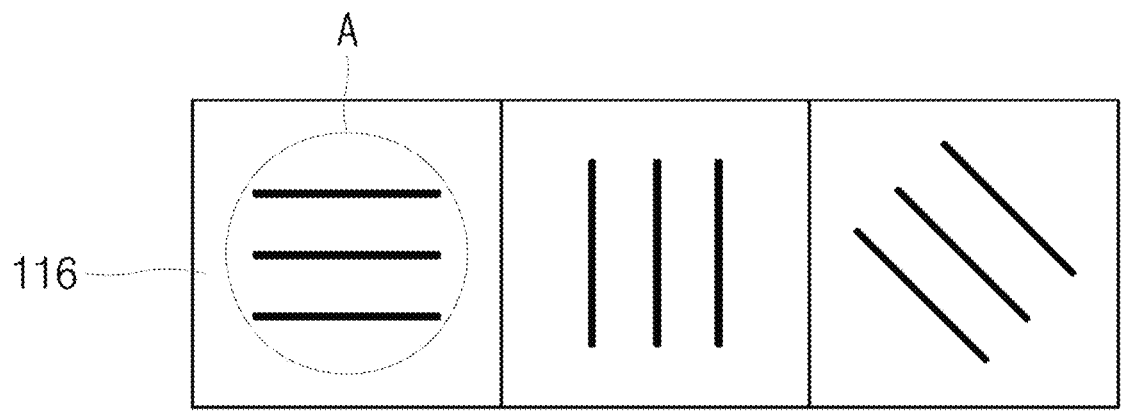
FIGS. 7A to 7C are schematic diagrams of patterns of welding regions according to various embodiments.
Figure 7B:
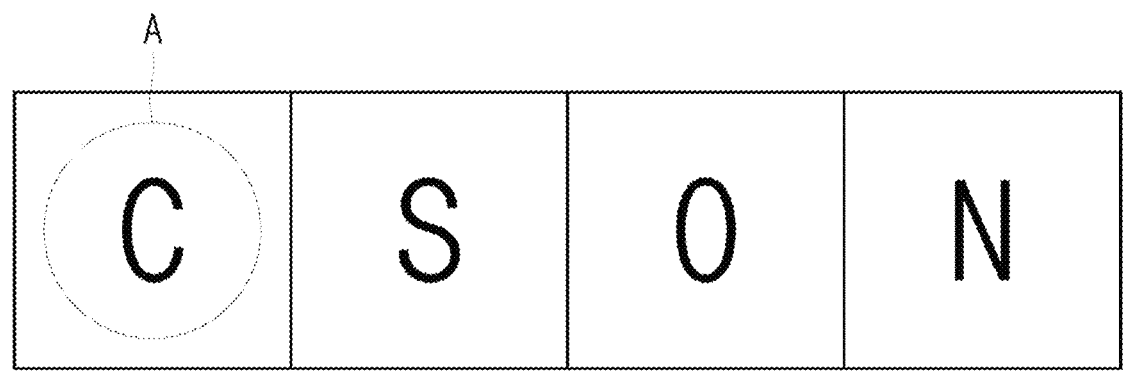
Figure 7C:
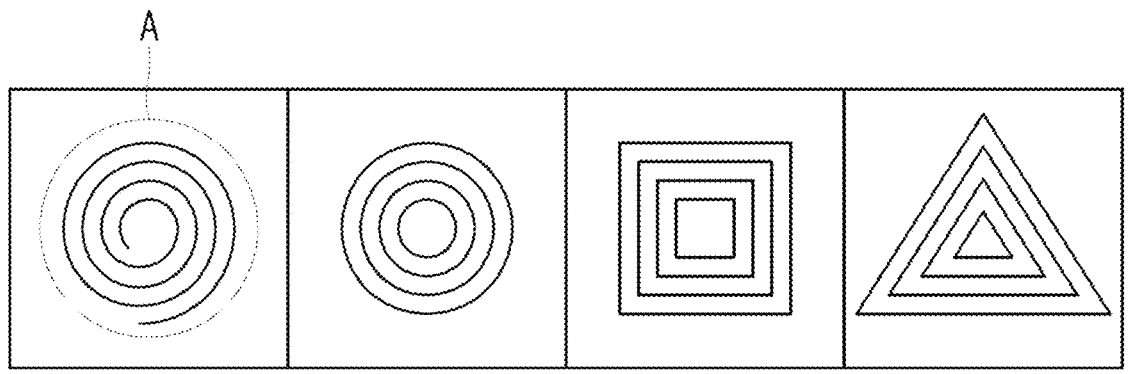

FIGS. 7A to 7C are schematic diagrams of shapes of welding regions, e.g., welding patterns, according to various embodiments.

As shown in FIG. 7A, the welding portion (A) may be implemented in a form in which a plurality of straight, e.g., and parallel, lines are arranged in various directions. When the straight lines are enlarged, spots overlap each other, but when viewed from a distance, each of the straight lines appears as a single straight line. The welding portion (A) having the straight-shaped lines may be implemented in any number of straight lines, e.g., at least one straight line, and may also be implemented at various angles. Although a welding portion (A) having three straight lines is shown in FIG. 7A, the welding portion (A) may be modified in various manners, e.g., by arranging one, two, four, or more straight lines in parallel to each other and at a specific angle with respect to an edge of the first electrode uncoated region.

In addition, as shown in FIG. 7B, the welding portion (A) may be implemented in a specific character shape. Although FIG. 7B shows the welding portion (A) in the form of an English alphabet by way of example, the welding portion A may be implemented in any suitable alphabet or symbols, e.g., in the form of Hangul consonants or vowels.

In addition, as shown in FIG. 7C, the welding portion (A) may be formed in the form of a repeating pattern. For example, the welding portion (A) may be implemented in a spiral form or in a form in which a same pattern, e.g., a circle/square/triangle, is sequentially arranged while varying the size thereof.

Figure 8A:
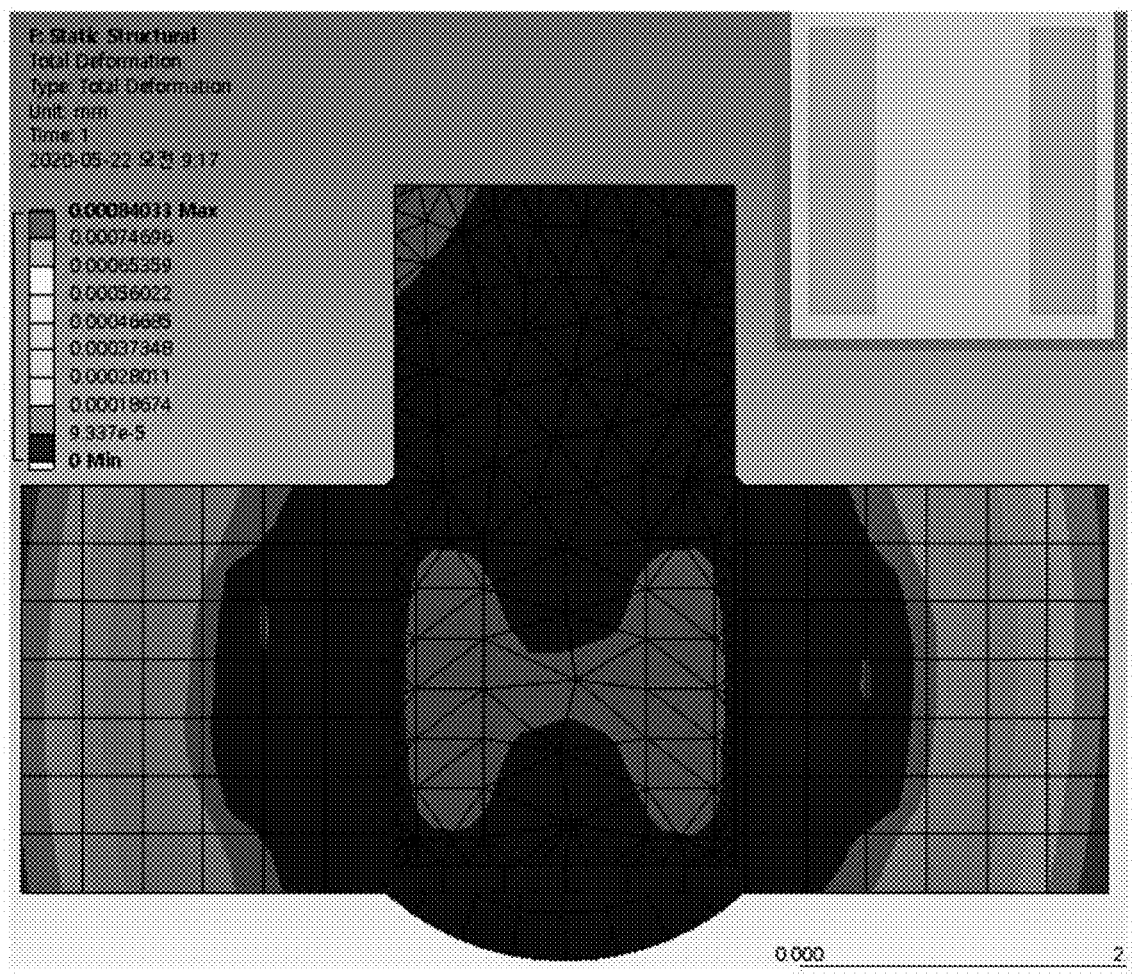
FIGS. 8A to 8C are diagrams of deformation amounts of welding portions according to various embodiments.
Figure 8B:
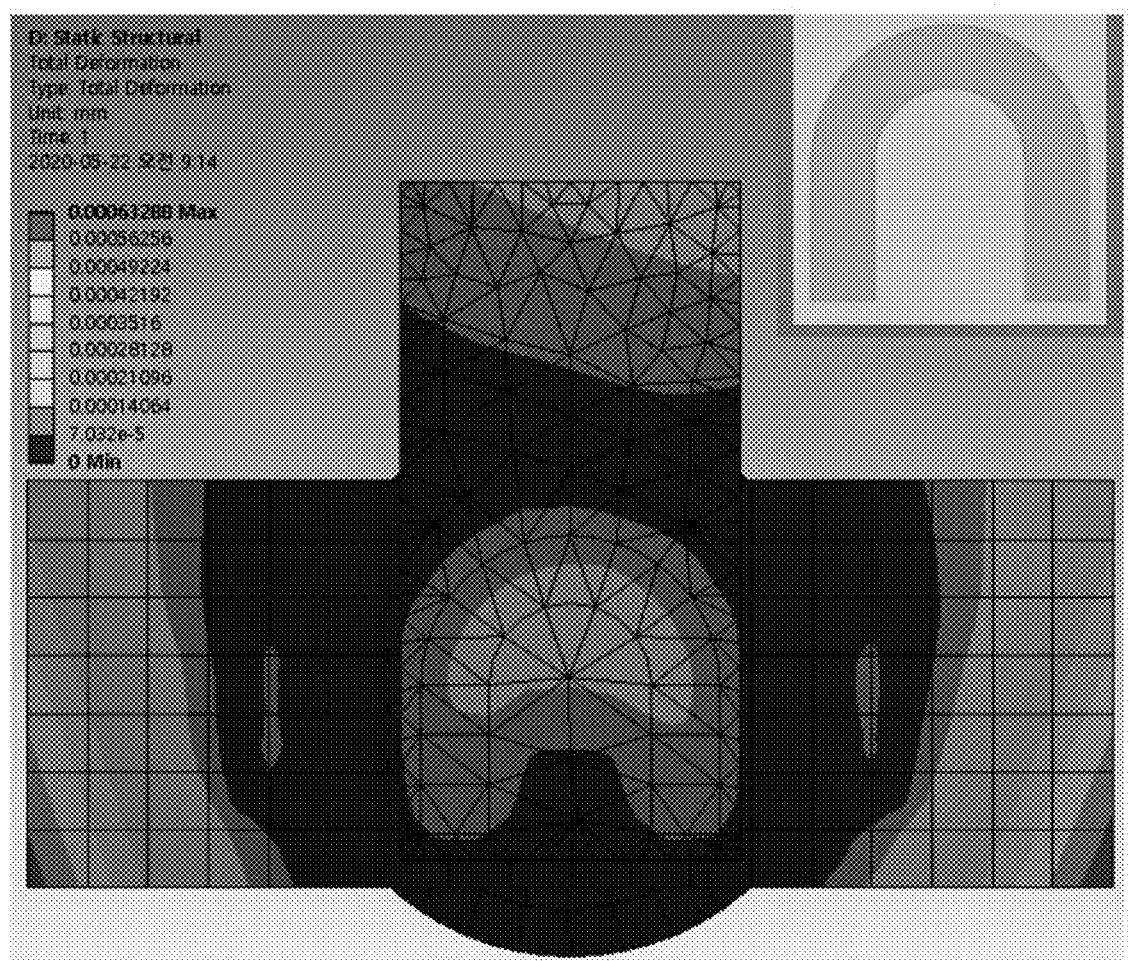
Figure 8C:
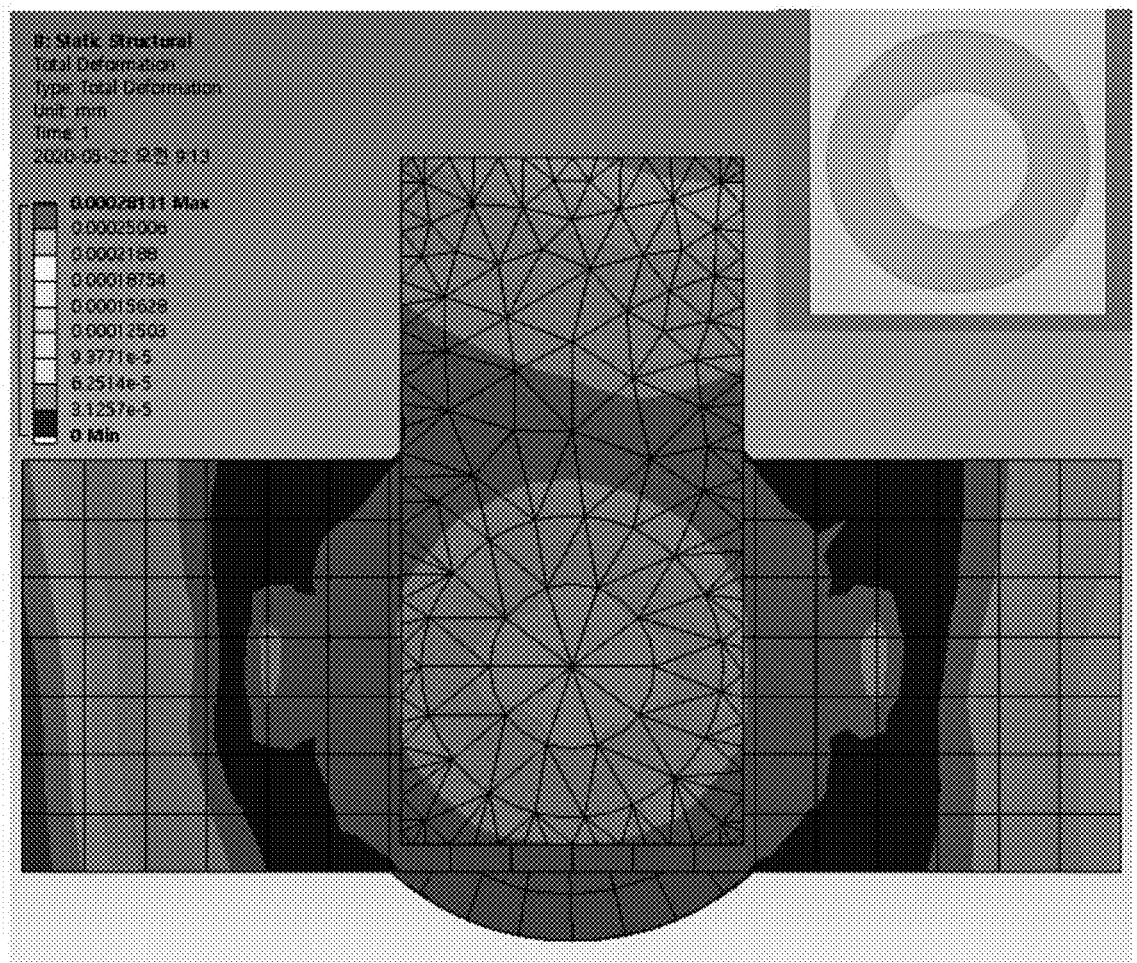

The shape of the welding portion (A) may be modified into an appropriate form through deformation amount analysis. FIGS. 8A to 8C are diagrams of deformation amounts of welding portions according to various embodiments. FIGS. 8A to 8C are diagrams showing the deformation amount of a welding portion when a jig for a welding apparatus is closely attached to the welding portion (A).

As shown in FIG. 8A, when the welding portion (A) is welded in a FIG. 11 shape, e.g., a laser is irradiated in a shape of two parallel lines, upper and lower sides of the welding portion (A) are not fixed, while only the left and right sides are fixed, which is defined as two-sided adhesion. Here, the welding portion (A) is in close contact with the jig for welding, and thus a slight deformation occurs. However, the amount of deformation of a thin-film substrate (uncoated region) around the welding portion A is almost negligible (the smaller the deformation amount, the darker the color (blue) of the welding portion (A)).

As shown in FIG. 8B, when the welding portion (A) is welded in an inverted 'U' shape (rather than a circle), the lower side of left and right sides is not fixed (e.g., the lower side of the inverted 'U'), while only the upper left and right sides are fixed (e.g., the upper side of the inverted 'U'), which is defined as three-sided adhesion, e.g., the three sides of the inverted 'U'. Here, the welding portion (A) is in close contact with the jig for welding, and thus a slight deformation occurs. However, the amount of deformation of a thin-film substrate (uncoated region) around the welding portion (A) is almost negligible.

As shown in FIG. 8C, when the welding portion (A) is welded in a circular shape, four sides of the upper, lower, left, and right are all in close contact, and thus the amount of deformation of a thin-film substrate is slightly increased, e.g., compared to the cases shown in FIGS. 8A and 8B. In this way, a pattern that minimizes the amount of deformation of the thin-film substrate (uncoated region) can be derived for each welding pattern shape of the welding portion (A) through deformation amount analysis. However, since the amount of deformation of the welding portion, to which laser welding is applied, is significantly smaller than that of the ultrasonic welding of a pressure welding method, the deformation amount analysis should be understood as a method for deriving an optimal welding pattern in the embodiments.

Meanwhile, in the case of the welding portion, penetration defects may occur depending on various conditions, e.g., the output of the laser beam. A method for automatically detecting such welding defects without operator's visual confirmation is proposed.

As described above in FIG. 5, the laser welding apparatus 30 may include the plurality of reflection members 32 and 34 for reflecting the light emitted from the welding portion, and the sensor 50 capable of detecting the reflected light.

The reflection members 32 and 34 transmit the reflected light emitted from the surface of the welding portion (A) to the sensor 50 when a laser beam is irradiated to the welding portion (A) of the welding apparatus. To this end, the reflection members 32 and 34 may be formed of a mirror or a metal material having a reflectivity greater than or equal to a predetermined reflectivity level.

The sensor 50 may be installed on one side of the laser welding apparatus 30 and detect reflected light introduced through the reflection members 32 and 34. For example, the sensor 50 may be provided as a photo diode sensor. The photodiode sensor is a sensor that converts light energy into electrical energy and outputs the intensity of light as a voltage value. Therefore, a penetration defect can be detected through the output voltage value. It can be determined that when the reflected light is detected by the sensor 50, welding is performed without a penetration defect, and when the reflected light is not detected or the reflected light of a predetermined set value or less is detected, a penetration defect with a minute crack or through hole has occurred.

Determination of such a defect of the welding portion A may be made by a controller of the laser welding apparatus 30 or a separate controller 70. The controller 70 may compare the voltage value output from the sensor 50 with a preset reference value to determine the quality of the welding portion (A), e.g., whether the welding portion (AO is properly welded. For example, when the voltage value is 0, which means that there is no reflected light due to potentially generated holes or cracks, the controller 70 determines that a penetration defect has occurred in the welding portion (A).

The sensor 50 and the controller 70 are connected in a wired or wireless manner and communicate in real time. Therefore, real-time monitoring of the welding portion is enabled.

By way of summation and review, ultrasonic welding may be generally used to join a separate multi-tab to the substrate tab in an electrode assembly. However, in the case of ultrasonic welding, only the presence/absence of welding can be determined by visual inspection, while welding defects, e.g., weak welding (a state where the bonding strength of a welded portion is low because welding is not properly performed), cannot be determined. In addition, in inspecting a portion to be subjected to ultrasonic welding, there is no separate quality verification method other than visual, e.g., appearance, inspection, making it difficult to secure the reliability of the ultrasonic welding. Thus, when laser welding is applied, it may not be easy to apply laser welding to an ultra-thin substrate because there is a risk of penetration due to the application of fusion welding.

Therefore, embodiments provide a laser welding method and a laser welding apparatus for a secondary battery, in which the welding quality of an ultra-thin welding area can be improved. That is, according to an embodiment, since a laser beam mode optimized for an ultra-thin film is used to prevent occurrence of a penetration defect, the penetration defect can be minimized, and the laser welding quality can be improved. In addition, according to an embodiment, by using a photodiode sensor, welding defects can be monitored in real time, thereby minimizing welding defects.

While only one embodiment has been described above, the present disclosure is not limited to the above-described embodiment and it will be understood by those of ordinary skill in the art that various changes in form and details may be made therein without departing from the spirit and scope of the present invention as defined by the following claims.

What is claimed is:

1. A laser welding method for a secondary battery, the method comprising:
   irradiating a first laser beam to laser-weld a first electrode substrate tab onto a first electrode uncoated region of a first electrode plate, such that the first laser beam is irradiated onto a first welding portion, the first welding portion being on an overlap region between the first electrode substrate tab and the first electrode uncoated region; and
   irradiating a second laser beam to laser-weld a second electrode substrate tab onto a second electrode uncoated region of a second electrode plate, such that the second laser beam is irradiated onto a second welding portion, the second welding portion being on an overlap region between the second electrode substrate tab and the second electrode uncoated region,
   wherein the first electrode substrate tab and the second electrode substrate tab are fusion-bonded to the first electrode uncoated region and the second electrode uncoated region, respectively, as a result of laser welding in a preset welding pattern at each of the first and second welding portions, and
   wherein irradiating the first and second laser beams includes applying intermittent pulses of a laser beam to target portions that overlap each other on the first and second welding portions, respectively, such that the preset welding pattern at each of the first and second welding portions is formed by overlapping spot-welded portions.

2. The laser welding method as claimed in claim 1, wherein the first and second welding portions are parts of the first electrode substrate tab and the second electrode substrate tab, respectively.

3. The laser welding method as claimed in claim 1, wherein the first and second welding portions are parts of the first electrode uncoated region and the second electrode uncoated region, respectively.

4. The laser welding method as claimed in claim 1, wherein forming the overlapping spot-welded portions includes forming the spot-welded portions without spaces therebetween.

5. The laser welding method as claimed in claim 1, wherein applying the intermittent pulses of the laser beam to target portions that overlap each other includes adjusting every pulse of the intermittent pulses to at least partially irradiate a previously irradiated target portion.

6. The laser welding method as claimed in claim 1, further comprising:
   detecting an incident light reflected from the preset welding pattern via a sensor; and
   comparing an output value of the sensor with a preset reference value to determine whether the preset welding pattern is defective.

7. The laser welding method as claimed in claim 6, wherein detecting the incident light includes using a photodiode sensor as a sensor.

* * * * *